Figure 1:
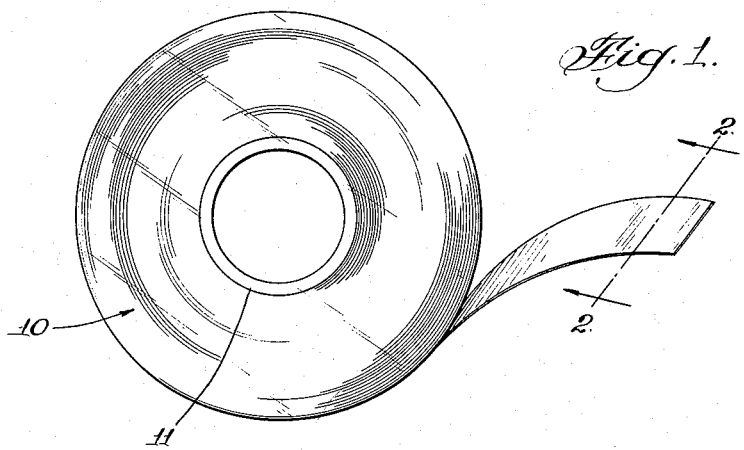

March 27, 1962 L. TRITSCH 3,027,337
PRESSURE-SENSITIVE ADHESIVES AND TAPES CONTAINING
SAME, SAID ADHESIVE COMPRISING A RUBBER, A
TACKIFYING RESIN AND AN EPOXY COMPOUND
Filed May 18, 1959

INVENTOR.
Ludwig Tritsch
BY James J. Fawcett
Associate Atty.

United States Patent Office 3,027,337
Patented Mar. 27, 1962

3,027,337
PRESSURE-SENSITIVE ADHESIVES AND TAPES CONTAINING SAME, SAID ADHESIVE COMPRISING A RUBBER, A TACKIFYING RESIN AND AN EPOXY COMPOUND
Ludwig Tritsch, Wilmette, Ill., assignor to The Kendall Company, Boston, Mass., a corporation of Massachusetts
Filed May 18, 1959, Ser. No. 814,103
15 Claims. (Cl. 260—5)

This invention relates to normally tacky and pressure-sensitive adhesives and adhesive tapes, and particularly to plastic backed electrical insulation tapes which are of exceptionally high thermal stability.

Because of their strength, oil and water resistance, electrical insulating properties, thinness and compactness and ease of application, pressure-sensitive tapes employing thermoplastic films, particularly those based on polyvinyl chloride and copolymers of vinyl chloride with other monomers, are enjoying increasing acceptance in commerce by electricians, electrical contractors, and others who require a high quality electrical insulating material. Vinyl backed adhesive tapes have certain thermal limitations however, due to the thermoplastic character of the polymer backing and also to the thermal degradation characteristics of vinyl compounds when exposed to elevated temperatures for long periods of time. The latter tendency is minimized by the use of stabilizing agents, such as for example, heavy metal salts, certain types of organic-inorganic phosphorus complexes, and the like.

When vinyl film is employed as a backing for a pressure-sensitive adhesive tape intended for electrical insulating purposes, it is necessary to use a preponderance of non-migrating polymeric plasticizer in the plasticizer composition of the backing to minimize the effect of the plasticizer on the initial and maintained properties of the adhesive. The use of such polymeric plasticizers increases the problems associated with the light and heat-stabilization of vinyl films, since it necessitates the use of processing temperatures substantially in excess of those commonly employed in the fabrication of vinyl compounds used in soft goods.

Since the heat and light stabilities of polyvinyl chloride films are dependent to a great extent on the previous heat and light history of such compounds, fabrication of polymer plasticized vinyl chloride compositions at the above average elevated temperatures required during such processing sensitizes these films, particularly to thermal decomposition.

One of the limitations of pressure-sensitive adhesive tapes employing polyvinyl chloride film backings containing polymeric plasticizers is the instability of the common commercial adhesives used in such tapes when exposed to temperatures of 100° C. or higher for moderately long periods of time. Under such temperature conditions conventional pressure-sensitive adhesive tapes having vinyl film backings have been found to be unusable, both when they are stored at such temperatures prior to use, and when they are actually applied as splicing insulation or for other purposes and subsequently exposed to operating temperatures of 100° C. or higher. Failure of performance of the tapes manifests itself in loss of tack and adhesion.

It is accordingly a primary object of the present invention to provide improved pressure-sensitive adhesives, in particular for use on vinyl backed adhesive tape suitable for electrical uses which retains its normal properties over extended periods of time and does not appreciably lose its properties of tack and adhesion when exposed to considerably higher than normal temperatures.

Further objects and advantages of the invention will become apparent from the following description and appended claims.

Figure 2:
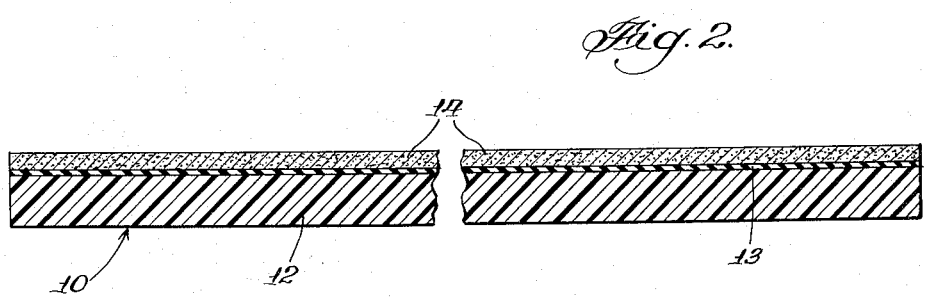
Figure 3:

FIG. 1 illustrates a roll of a typical pressure-sensitive tape of this invention. FIG. 2 represents an enlarged partial cross-sectional view taken along the lines 2—2 of FIG. 1 and showing the relative thickness and construction of a typical tape of this invention. FIG. 3 illustrates a wire splice with a typical wrapping of the tape of this invention.

I have found that by proper choice of suitable cyclical oxygen ethers together with certain viscous non-migrating polyesters, added in small amounts to the adhesive, vinyl backed insulating tapes may be employed for long periods of time at elevated temperatures of 100° C. or above. By the combined use of the epoxy materials and the polymeric polyesters in the adhesive a stabilizing and dispersing effect is obtained which both protects the mass against the degrading action of the gaseous decomposition products of the vinyl chloride backing and improves the compatibility of certain components of the pressure-sensitive adhesive at the indicated temperatures.

Commercial grades of polyvinyl chloride and its copolymers show considerable lot-to-lot variations as to thermal and light stability due to structural differences in the polymer and to varying degrees of contamination. These variations, coupled with those which may arise from temperature variations and the inefficient dispersion of plasticizers, stabilizers, and processing aids in the production of vinyl films, may in turn result in further lot-to-lot variations in the finished film. The combination of epoxy compound and polymeric polyester of this invention is particularly advantageous in minimizing the adverse effects of these variations in adhesive systems.

The improved electrical tapes of the invention in general comprise a backing film of polyvinyl chloride, or copolymers thereof, and a pressure-sensitive adhesive layer of the usual rubber-resin type, to which certain materials are added during the preparation of the adhesive mass. If desired, a suitable tie-coat or primer may be applied to the backing prior to the application of the adhesive layer, but such anchor-coats are not essential to obtain the desired results.

The adhesive compositions employed in the preparation of these tapes comprise a rubber, preferably a blend of natural rubber and synthetic rubber of the type of styrene butadiene copolymer (for example GR–S) in a weight ration of 1:9 to 2.5:7.5; a tackifying resin system preferably consisting of a blend of wood rosin derivative and a polyterpene resin varying from 100% wood rosin derivative and 0% polyterpene resin to 100% polyterpene resin to 0% wood rosin derivative. In addition, there is present in the adhesive mass from 0.5 to 10% of a mixture containing an epoxy compound and a polymeric ester in ratios varying from 5:95 to 95:5, based on the total weight of the elastomer-resin composition.

Suitable variations of the rubber and rosin components of the mass normally encountered in such adhesive compositions may be employed in the preparation of the adhesive layer, and if desired, certain other materials commonly found in pressure-sensitive adhesive mixtures may be added, such as anti-oxidants, age resistors, pigments, or the like.

The epoxy compounds, including high molecular weight compounds, that is, epoxy resins, are characterized by at least one cyclical oxygen ether group, per molecule, wherein the oxygen connects two adjacent carbon atoms in the molecule. This group is commonly referred to as an epoxy group, hence the reference to this class of compounds as epoxy compounds. Structurally, the epoxy group is generally designated as

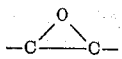

The carbon atoms of the epoxy group may be part of a straight chain or cyclic aliphatic portion of the epoxy compound. Epoxy compounds suitable for the purpose of this invention are preferably non-volatile under the conditions employed for compounding the pressure-sensitive adhesive and applying the same to suitable backings to form pressure-sensitive adhesive tapes. The following types are illustrative of the broad class of epoxy compounds from which, preferably, suitably non-volatile epoxy compounds may be chosen for use in the pressure-sensitive adhesives of this invention. One type of epoxy compound may be prepared by reacting suitably unsaturated aliphatic hydrocarbons, such as polybutadiene, or numerous other olefinic hydrocarbons with an organic peroxy acid. Similarly, suitably unsaturated aliphatic acids and derivatives thereof, such as fatty acids, esters of fatty acids of mono- and polyhydroxy alcohols, and polyesters of polybasic acids and polyhydroxy alcohols, may be reacted with organic peroxy acids to form epoxidized derivatives thereof. Examples of commercial resins of this type which are suitable for the purpose of this invention are epoxidized soybean oil fractions, such as those sold by Rohm & Haas under the names Paraplex G–60, Paraplex G–61 and Paraplex G–62, and epoxidized azelaic acid ester sold by Emery Industries Incorporated under the trade name Plastolein 3051–R. Other epoxidized derivatives of aliphatic acids are epoxy stearic acid alkyl esters sold under the trade name Drapex 3.2, and epoxidized methyl esters of hydroxy stearic acid, epoxidized isobutyl ester of acetoxy stearic acid and epoxidized butyl ester of stearic acid sold under the name Estynox by Baker Castor Oil Company. Examples of epoxidized esters, wherein the epoxy group is part of a ring structure, are the diisodecyl and the di(2,-ethyl-hexyl) esters of 4,5 epoxy tetrahydrophthalic acid, available from Union Carbide Chemicals Company under the trade names Flexol 163–D and Flexol 107–D respectively. Furthermore, 4,5 epoxy tetrahydrophthalate polyesters may be prepared by the use of polyhydric alcohols, such as diethylene glycol, instead of monohydric alcohols referred to above. Representative of another type of commercially available epoxy compounds from which suitably non-volatile compounds may be chosen for use in accordance with this invention are epoxidized aliphatically substituted aromatic compounds, for example, epoxy derivatives of mixed aliphatic-aromatic ethers, and epoxy derivatives of olefinic substituted aromatic compounds. These epoxy compounds are reaction products which may be formed by condensing mono- or polyhydric aromatic compounds, or mixtures thereof, with epichlorohydrin, or a halohydrin such as 1,3 dichloro-2-hydroxy propane or 1,2 dichloro-3-hydroxy propane, or a diepoxide such as butadiene dioxide or diglycidyl ether, or mixtures thereof. Representative polyhydric aromatic compounds are phenols and include resorcinol, hydroquinone, catechol, phloroglucinol, and various bis-phenols resulting from the condensation of phenol with aldehydes and ketones, such as p,p'dihydroxy diphenyl dimethyl methane (bis-phenol A), p,p'dihydroxy 1,1'dinaphthyl methane, polyhydroxy naphthalenes and anthracenes, o,o'p,p'-tetrahydroxy diphenyl dimethyl methane, p-hydroxy phenyl p-hydroxy m-(p-hydroxy phenyl) phenyl dimethyl methane, and the like. Examples of monohydroxy aromatic compounds are phenol, alkyl substituted phenols wherein the alkyl group is ordinarily in the ortho and/or para position and monohydroxy polynuclear aromatic compounds and alkyl derivatives thereof. Commercially available compounds of this type which have been found suitable include the epoxy compounds sold under the name Epon 834, 828 and 1001 by the Shell Chemical Company, which are condensation products of epichlorohydrin and bis-phenol A. Another suitable non-volatile epoxy compound of this type is an epoxy resin sold under the trade name Alk-O-Flex S–453 by Alkydol Laboratories Incorporated, which is a condensation product of epichlorohydrin and an alkyl substituted monohydric phenol. Ordinarily, the alkyl substituent may contain from four to eight carbon atoms. Other examples of suitable epoxy compounds are epoxidized "novalacs" which may be prepared in the manner referred to in British Patent No. 746,824.

Suitable polymeric esters for use in the invention include resinous polymeric esters of polybasic acids and polyhydric alcohols, as for example, an ester of 2 ethylhexane diol 1, 3 and adipic acid sold by Union Carbide Chemicals Company under the trade name Flexol R–2H; an ester of polyethylene-propylene glycol and sebacic acid, such as that sold by Rohm & Haas under the trade name Paraplex G–25; a modified polyester of mixed dihydroxy alcohols and mixed aliphatic dicarboxylic acids, which have more than 6 carbon atoms in the chain, sold by Rohm and Haas under the trade name Paraplex G–53; and the like. The terms polybasic acid and polycarboxylic acid are used interchangeably herein.

Suitable polyterpene resins for use in the adhesive formulations of the invention include polymerized beta-pinene, such as for example, the various thermoplastic pinene resins sold by the Pennsylvania Industrial Chemical Company under the name Piccolyte. The wood rosin derivatives used according to the invention are those commonly used in the preparation of typical rubber-rosin type adhesive masses, e.g. hydrogenated wood rosin ester, a polyhydric alcohol ester of maleic modified heat-isomerized wood rosin, polymerized rosin acids, and the like.

Referring now to the drawings, FIG. 1 illustrates a roll of typical pressure-sensitive tape 10 on a core 11. FIG. 2 represents an enlarged cross-sectional view of the tape of FIG. 1 showing the relative thickness of the vinyl resin backing 12, the tie-coat 13 and the pressure-sensitive adhesive 14. FIG. 3 illustrates a wire splice of insulated wires 15 and 16 with a typical pressure-sensitive tape of this invention wrapped over the bare wire splice to provide insulation.

A further understanding of the invention will be derived from the following examples, which demonstrates the beneficial effects to be obtained by incorporating certain additives in conventional adhesive compositions.

Pressure-sensitive electrical insulating tapes were prepared having a vinyl film backing in which only polymeric plasticizers were used, a rubber latex type of tie-coat and a variety of adhesive systems. The basic formulation of the vinyl film employed in the examples was as follows:

| | Parts by weight |
|---|---|
| Polyvinyl chloride resin | 100 |
| Flexol R–2H | 53 |
| Carbon black | 0.25 |
| Heat and light stabilizers | 0.5 |

The following materials were used in the tie-coat in each instance:

| | Parts by weight |
|---|---|
| Geon polyblend latex | 50 |
| Neoprene latex | 50 |

*Example 1*

The following adhesive formulations were cast from a blended aliphatic solvent, such as Skellysolve D, which is a mixture of heptane isomers having a boiling range of 177 to 230° F., onto the above described film which had been previously coated with the tie-coat. After applying the adhesive material the coated backings were dried and converted into finished tape rolls. The figures in each instance represent parts by weight.

|  | A | B | C | D | E | F |
|---|---|---|---|---|---|---|
| GR-S | 35 | 35 | 35 | 35 | 35 | 35 |
| Natural Rubber | 10 | 10 | 10 | 10 | 10 | 10 |
| Silica | 7.0 | 7.0 | 7.0 | 7.0 | 7.0 | 7.0 |
| Carbon Black | 1.25 | 1.25 | 1.25 | 1.25 | 1.25 | 1.25 |
| Age Resistors | 3.75 | 3.75 | 3.75 | 3.75 | 3.75 | 3.75 |
| Hydrogenated Wood Rosin Ester | 21.0 | 21.0 | 21.0 | 21.0 | 21.0 | 21.0 |
| Polymerized Pinene |  |  |  | 21.0 |  | 21.0 |
| Polymerized Rosin Acids | 21.0 | 21.0 | 21.0 |  | 21.0 |  |
| Epoxidized Soybean Oil |  | 2.1 | .4 | .4 |  |  |
| Flexol R-2H | 2.1 |  | 1.7 | 1.7 |  |  |

Tape samples of each adhesive formulation were aged for 24 and 72 hours at 250° F. and for 60 days at 87° C. in a circulating air oven. The samples were aged in roll form, and in the form of splice wraps wound on rat tail splices prepared from No. TW–14 insulated wire.

Examination of all of the tape samples after exposure of 24 and 72 hours at 250° F. showed that all the samples, with the exception of sample E, had retained a sufficient amount of their pressure-sensitive properties to perform a useful function as a pressure-sensitive insulating tape. Sample E, on the other hand, had almost completely lost its pressure-sensitive properties after the first 24 hours of heat exposure. More specifically, the examination showed that after 24 hours of aging at 250° F. sample E had very poor tack retention, samples A, B, and F had moderately good tack retention, and samples C and D had excellent tack retention. The adhesion properties of all the samples were satisfactory. After 72 hours of aging at 250° F. the adhesive on sample E was completely dead, that is, it had no tack and no adhesion and had lost all its pressure-sensitivity. Under the same conditions, samples A and B showed moderate tack retention and good adhesion, samples C and F showed good tack retention and good adhesion, while sample D showed excellent tack retention and good adhesion.

Examination of samples aged for 60 days at 87° C. showed a complete deadening of the adhesive of sample E, moderate retention of pressure-sensitive properties of samples A and B, good retention of adhesive characteristics of samples C and F, and excellent retention of pressure-sensitivity of sample D.

The following adhesive formulations were cast from the same solvent as that described in Example I onto a film prepared as hereinbefore described, which had been previously coated with the tie-coat:

*Example II*

Parts by weight

| | |
|---|---|
| Natural rubber | 10 |
| GR–S | 30 |
| Clay | 5 |
| Age resistors | 2 |
| Pentaerythritol ester of hydrogenated wood rosin | 50 |
| Epon 1001 | 1 |
| Paraplex G–25 | 1 |

*Example III*

Parts by weight

| | |
|---|---|
| Natural rubber | 5 |
| GR–S | 35 |
| Clay | 5 |
| Phthalocyanine Green | 0.2 |
| Age resistors | 2 |
| Glycerol ester of hydrogenated wood rosin | 35 |
| Polymerized Beta-pinene | 15 |
| Paraplex G–53 | 3 |
| Alk-O-Flex S–453 | 2 |

Although it is desirable in many instances to employ a tie-coat it is to be understood that such materials are not essential in order to obtain the advantageous results in the finished adhesive tape.

In general, it has been found as a result of the above tests that polymeric esters aid the adhesive mass in retaining its normal tack properties even after exposure to elevated temperatures for extended periods. The epoxide compounds, on the other hand, help to offset or protect the adhesive mass from the deleterious action of any decomposition products which form on exposing the vinyl film to raised temperatures. Thus, both the polymeric esters and the epoxide compounds act on the mass in a manner which enables it to retain its normal properties of tack, adhesion and creep resistance. It has also been found by these tests that the combined effect of these additives is synergistic, in that the retention of the tack and adhesion properties is even greater than would be expected. For example, a certain amount of tack retention is obtained by employing a polymeric ester alone or an epoxide compound alone as the additive agent. However, the improvement obtained by adding both materials to the mass is even greater than the sum total of separate effects. The pressure-sensitive adhesives of this invention may be employed with other than polyvinyl backings, for example, backings based on polyethylene films.

Certain advantages are also obtained by adding a polyterpene to the adhesive composition in addition to the polymeric ester and the epoxy compound. Thus, when betapinene or other similar polyterpene is added to the rubber-rosin mass in addition to the other additives, the properties of tack and adhesion are retained to an even greater degree than without the presence of the polyterpene.

This application is a continuation-in-part of application Serial No. 581,319, filed April 30, 1956 now abandoned.

What is claimed is:

1. In a normally tacky pressure-sensitive adhesive comprising a rubber and a tackifying resin, the combination therewith of an epoxy compound.

2. In a normally tacky pressure-sensitive adhesive comprising a rubber and a tackifying resin, the combination therewith of an epoxy compound and a polymeric ester of a polycarboxylic acid and a polyhydric alcohol.

3. A pressure-sensitive normally tacky adhesive comprising a rubber, a rubber-tackifying resin, an epoxidized compound chosen from the group consisting of epoxidized aliphatically substituted aromatic compounds and epoxidized derivatives of aliphatic acids, and a polymeric ester of a polycarboxylic acid and a polyhydric alcohol, said epoxidized compound and said polymeric ester being present in amounts sufficient to impart thermal stability to said adhesive.

4. The adhesive of claim 3 wherein the rubber is a blend of natural and synthetic rubber.

5. The adhesive of claim 3 wherein the epoxidized compound is epoxidized soybean oil.

6. A pressure-sensitive normally tacky adhesive tape comprising a flexible vinyl resin film and a coating of the adhesive of claim 3 thereon.

7. A pressure-sensitive normally tacky adhesive tape comprising a flexible vinyl resin film backing and a firmly adherent coating of an adhesive thereon, said coating consisting of a rubber-rosin base containing small amounts of epoxidized soybean oil and a polymeric ester of 2-ethylhexanediol 1,3 and adipic acid, said rubber-rosin base containing a blend of natural rubber and synthetic rubber in a weight ratio of 1:9 to 2.5:7.5 and a tackifying resin system comprising at least one of the resins chosen from the group consisting of polyterpene resin, wood rosin and wood rosin derivatives, said epoxidized oil and said polymeric ester being present in amounts sufficient to impart thermal stability to said adhesive.

8. The invention of claim 7 wherein the synthetic rubber is a styrene-butadiene copolymer and the tackifier resin system comprises a blend of hydrogenated wood rosin ester and polyterpene resin.

9. A pressure-sensitive normally tacky adhesive comprising a rubber, an epoxidized compound chosen from the group consisting of epoxidized aliphatically substituted aromatic compounds and epoxidized derivatives of aliphatic acids, rubber-tackifying resin including at least one of the resins chosen from the group consisting of polyterpene resins, wood rosin and wood rosin derivatives, and a polymeric ester of a polycarboxylic acid and a polyhydric alcohol said epoxidized compound and said polymeric ester being present in amounts sufficient to impart thermal stability to said adhesive.

10. A pressure-sensitive normally tacky adhesive comprising a rubber, a rubber tackifying resin, an epoxidized compound chosen from the group consisting of epoxidized aliphatically substituted aromatic compounds and epoxidized derivatives of aliphatic acids and a polymeric ester of a polycarboxylic acid and a polyhydric alcohol said epoxidized compound and said polymeric ester being present said adhesive as a mixture in ratios varying from 5:95 to 95:5 in amounts from 0.5% to 10% of the total weight of said adhesive.

11. A pressure-sensitive normally tacky adhesive comprising a rubber, rubber tackifying resin including at least one of the resins chosen from the group consisting of polyterpene resins, wood rosin and wood rosin derivatives and from .5 to 10% of the total weight of said adhesive of a mixture of an epoxidized compound chosen from the group consisting of epoxidized aliphatically substitued aromatic compounds and epoxidized derivatives of aliphatic acids and a polymeric ester of a polycarboxylic acid and a polyhydric alcohol.

12. A pressure-sensitive normally tacky adhesive comprising a blend of natural and synthetic rubbers, a tackifying resin and sufficient amounts of a mixture of a polymeric ester of a polycarboxylic acid and a polyhydric alcohol with an epoxidized compound chosen from the group consisting of epoxidized aliphatically substituted aromatic compounds and epoxidized derivatives of aliphatic acids to impart thermal stability to said adhesive.

13. A pressure-sensitive normally tacky adhesive consisting of a rubber-rosin base containing small amounts of epoxidized soybean oil and a polymeric ester of 2-ethyl-hexanediol 1,3 and adipic acid said rubber rosin base containing a blend of natural rubber and synthetic rubber in a weight ratio of 1:9 to 2.5:7.5 and a tackifying resin system comprising at least one of the resins chosen from the group consisting of polyterpene resin, wood rosin and wood rosin derivatives, said epoxidized oil and said polymeric ester being present in amounts sufficient to impart thermal stability to said adhesive.

14. The pressure-sensitive adhesive of claim 1 wherein the rubber is a blend of natural rubber and a butadiene-styrene rubber.

15. The pressure-sensitive adhesive of claim 2 wherein the rubber is a blend of natural rubber and butadiene-styrene rubber.

References Cited in the file of this patent

UNITED STATES PATENTS

| | | |
|---|---|---|
| 2,802,800 | Sprules et al. | Aug. 13, 1957 |
| 2,877,141 | Shelley et al. | Mar. 10, 1959 |
| 2,887,403 | Wolff | May 19, 1959 |